(12) United States Patent
Assouad

(10) Patent No.: US 6,438,715 B1
(45) Date of Patent: Aug. 20, 2002

(54) TRACE OPERATIONS IN AN INTEGRATED CIRCUIT FOR A DISK DRIVE

(75) Inventor: Nicolas C. Assouad, Niwot, CO (US)

(73) Assignee: STMicroelectronics N.V. (NL)

( * ) Notice: Subject to any disclaimer, the term of this patent is extended or adjusted under 35 U.S.C. 154(b) by 0 days.

(21) Appl. No.: 09/072,514

(22) Filed: May 4, 1998

(51) Int. Cl.[7] .................. H02H 3/05; H02K 19/003; H04B 1/74; H04L 1/22; H05K 10/00
(52) U.S. Cl. ............. 714/45; 714/38; 714/704; 369/84; 360/15; 360/32
(58) Field of Search ........... 714/45, 38; 395/183.21, 395/704; 369/84; 360/15, 32

(56) References Cited

U.S. PATENT DOCUMENTS

| | | | |
|---|---|---|---|
| 4,410,917 A | * 10/1983 | Newdoll et al. | 360/15 |
| 4,423,508 A | * 12/1983 | Shiozaki et al. | 371/16 |
| 4,527,273 A | * 7/1985 | Hibi et al. | 371/38 |
| 4,571,677 A | * 2/1986 | Hirayama et al. | 364/200 |
| 4,783,762 A | * 11/1988 | Inoue et al. | 364/900 |
| 5,365,381 A | * 11/1994 | Scheffler | 360/15 |
| 5,602,692 A | * 2/1997 | Freitas et al. | 360/77.08 |
| 5,657,176 A | * 8/1997 | Moribe et al. | 360/31 |
| 5,748,585 A | * 5/1998 | Tsukamoto et al. | 369/47 |
| 5,966,440 A | * 10/1999 | Hair | 380/4 |
| 5,978,937 A | * 11/1999 | Miyamori et al. | 714/45 |
| 6,119,254 A | * 9/2000 | Assouad et al. | 714/724 |

* cited by examiner

Primary Examiner—Ayaz Sheikh
Assistant Examiner—Frantz B. Jean
(74) Attorney, Agent, or Firm—Lisa K. Jorgenson; William J. Kubida (57) ABSTRACT

The invention includes a drive control integrated circuit with an intelligent and efficient tracing capability. The drive control integrated circuit executes operating instructions grouped into modules. The drive control integrated circuit stores the module numbers for executed modules in a memory. System designers can then retrieve the module numbers from the memory to assess the operation of the drive control integrated circuit. Some typical modules are read, write, seek, error, and servo modules. The drive control integrated circuit also stores operating parameters associated with the executed modules in the memory. Some typical operating parameters are instruction codes, head numbers, cylinder numbers, and error codes. The invention allows system designers to specify a particular trace operation and wait for the drive control integrated circuit to load the module numbers and operational parameters of interest into the memory. The use of selected module numbers and operating parameters reduces the amount of data typically stored in conventional trace operation. The effect of the trace operation on system performance is negligible and allows for accurate system evaluation under realistic operating conditions.

61 Claims, 7 Drawing Sheets

LAST VIEW →

BOS →

110

| | | | |
|---|---|---|---|
| 0 | 0 | 0 | 0 |
| 1 | 07 | 03 | 965 |
| 2 | 07 | 03 | 965 |
| 22 | 03 | 965 | 0 |
| 30 | 105 | 1 | 0 |
| 31 | 0.75 | 0.76 | 0 |
| 33 | 0.01 | 0.02 | 0 |
| 35 | 0 | 0 | 0 |

TRACE →

TRACE OPERATIONS IN AN INTEGRATED CIRCUIT FOR A DISK DRIVE

FIELD OF THE INVENTION

The invention is related to the field of disk drives, and in particular, to the addition of tracing logic into a drive control integrated circuit.

Problem

A disk drive stores user data on a disk device. The disk drive includes a drive control integrated circuit that controls the transfer of data between the user and the disk device. The drive control integrated circuit also controls the positioning of heads in the disk device to read and write the data to the proper locations on the disks. When the data is written to the disk device, the drive control integrated circuit obtains the data from the user, positions the appropriate head, and transfers the data to the disk device. When the data is subsequently read, the drive control integrated circuit re-positions the appropriate head, obtains the data from the disk device, and transfers the data to the user.

System designers analyze the operation of the drive control integrated circuit to correct errors and optimize performance. The operation of circuitry is analyzed by monitoring points in the circuitry to identify the information flowing between circuit elements. The acquisition of this operational information from a circuit is called tracing. For example, it is important to trace the sequence of instructions that are executed in the drive control integrated circuit in response to particular conditions. The sequence of instructions is traced by monitoring the instruction addresses and program data that are present on the address bus.

In the past, the drive control integrated circuit consisted of multiple integrated circuits connected by an external bus. System designers performed tracing operations by simply connecting a logic analyzer or circuit emulator to the external bus. As technology has advanced, the integrated circuits have been combined into a single drive control integrated circuit with an internal bus. The use of a logic analyzer or circuit emulator is no longer practical since the bus has been incorporated into the integrated circuit and is not available for convenient external connection.

One prior solution to this problem is disclosed in U.S. patent application No, 08/997130 entitled "Hardware Tracing/Logging For Highly Integrated Embedded Controller Device", filed on Dec. 23, 1997, and that is hereby incorporated by reference into this application. The prior solution adds trace logic to the drive control integrated circuit to monitor internal operations. The trace logic identifies data and address information from the internal bus and stores this information in a memory. The system designers then retrieve the data and address information from the memory to study the operation of the drive control integrated circuit.

The prior solution allows the system designers to select particular data and address information for detection and storage in the memory. In a typical trace operation, the data and address information can quickly exceed the capacity of the memory allocated for the trace. The data and address information is then either overwritten or the trace is stopped. In addition, a complex listing of data and address information is difficult to analyze for program flow and important operational parameters. Disk drives would be improved by technology that provided a more intelligent and efficient tracing capability within the drive control integrated circuit.

Solution

The invention solves the above problem by providing a drive control integrated circuit with an intelligent and efficient tracing capability. The drive control integrated circuit executes operating instructions that are grouped into modules. The drive control integrated circuit stores the module numbers for the executed modules in a memory. System designers can then retrieve the module numbers from the memory to assess the operation of the drive control integrated circuit. Some typical modules are read, write, seek, track follow, error, and other servo modules. The drive control integrated circuit also stores operating parameters associated with the executed modules in the memory. Some typical operating parameters are instruction codes, head numbers, cylinder numbers, and error codes.

A processor in the drive control integrated circuit executes the modules. Each module includes a trace macro that expands to a set of instructions. The instructions direct the processor to move the module number and associated operating parameters to storage locations. The storage locations could be registers on the processor bus. A trace controller in the drive control integrated circuit obtains the module number and associated operating parameters from the storage locations. The trace controller starts and stops the transfer of the module numbers and operating parameters based on the module numbers in the storage locations. Alternatively, the trace controller starts and stops the transfer of the module numbers and operating parameters based on addresses from the processor bus. The trace controller also includes a data filter that selects particular module numbers for storage in the memory along with their associated operating parameters.

Advantageously, the invention allows system designers to specify a particular trace operation and wait for the drive control integrated circuit to load the module numbers and operational parameters of interest into the memory. The use of selected module numbers and operating parameters reduces the amount of data typically stored in conventional trace operation. The reduction in data increases the available bandwidth for access to the memory. The reduction in data also allows a detailed trace without filling up the memory allocated for the trace.

Since arbitration is used to allow the trace controller to access the memory, the trace operation is effectively transparent to system performance. In addition, the processor only executes an additional trace macro in each module to support the trace. The effect of the trace operation on the processor is negligible. Therefore, the invention provides programmable and efficient tracing without influencing real-time system performance. This lack of impact allows for accurate system evaluation under realistic operating conditions.

DETAILED DESCRIPTION

Figure 1:
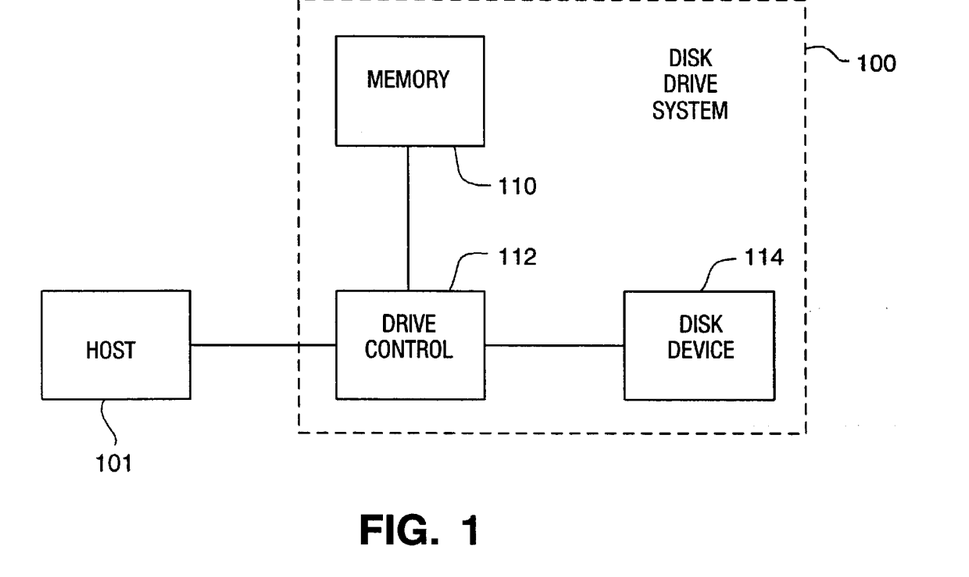
FIG. 1 is a block diagram of a disk drive in an embodiment of the invention.

Disk Drive Configuration and Operation—FIG. 1

FIG. 1 depicts a disk drive 100 that stores user data for a host 101. The disk drive 100 includes a memory 110, a drive control integrated circuit 1 12, and a disk device 114. The drive control integrated circuit 112 is coupled to the host 101, the memory 110, and the disk device 114.

Aside from the modifications to the drive control integrated circuit 112 to facilitate tracing, these elements can be conventional. The host 101 could be a conventional personal computer. The memory 110 could be conventional RAM. The memory 110 is external to the drive control integrated circuit 112, but the memory 110 could be integrated within the drive control integrated circuit 112 in alternative embodiments. The disk device 114 could be conventional, such as the VOYAGER 3 supplied by Samsung. Those skilled in the art will appreciate that some conventional elements of the disk drive 100 have been omitted for reasons of clarity. For example, a read channel integrated circuit and a voice coil motor integrated circuit would typically be included in the disk device 114. The read channel integrated circuit could be a model ADRT 1000 supplied by Analog Devices and the voice coil motor integrated circuit could be a model HA13561 supplied by Hitachi.

The drive control integrated circuit 112 controls the operation of the disk drive 100. The drive control integrated circuit 112 controls the data transfer between the host 101 and the disk device 114. The drive control integrated circuit 112 also controls the positioning of the disk device 114 so the heads are located over the proper point on the disks. The positioning operation is often referred to as a "seek" and a "track follow." The drive control integrated circuit 112 can be adapted from the model AIC-5460 supplied by Adaptec of Milpitas, Calif.

In operation, the host 101 stores and retrieves user data as follows. The host 101 transfers the user data to the drive control integrated circuit 112. The drive control integrated circuit 112 writes the user data to the memory 110. The drive control integrated circuit 112 directs the positioning of the disk device 114 so the appropriate head is over the desired location on the disk. The drive control integrated circuit 112 then reads the user data from the memory 110 and transfers the user data to the disk device 114. The disk device 114 writes the user data to the correctly positioned disk.

The drive control integrated circuit 112 subsequently receives a request from the host 101 to retrieve the user data. The drive control integrated circuit 112 first determines if the requested user data is already in the memory 110. If the requested user data is in the memory 110, then it is immediately transferred to the host 101. If the requested user data is not in the memory 110, then the drive control integrated circuit 112 directs the positioning of the disk device 114 so the appropriate head is over the requested user data. The disk device 114 reads the user data from the disk and transfers the data to the drive control integrated circuit 112. The drive control integrated circuit 112 writes the user data to the memory 110. The drive control integrated circuit 112 then reads the user data from the memory 110 and transfers it to the host 101.

The drive control integrated circuit 112 includes a processor that executes instructions to control the above-described operations. The instructions are organized into program modules. The drive control integrated circuit 112 includes tracing logic that identifies the modules that are executed by the processor. The tracing logic also identifies selected operating parameters associated with the identified modules. The tracing logic stores the identity of selected modules along with the associated operating parameters in the memory 110.

Figure 2:
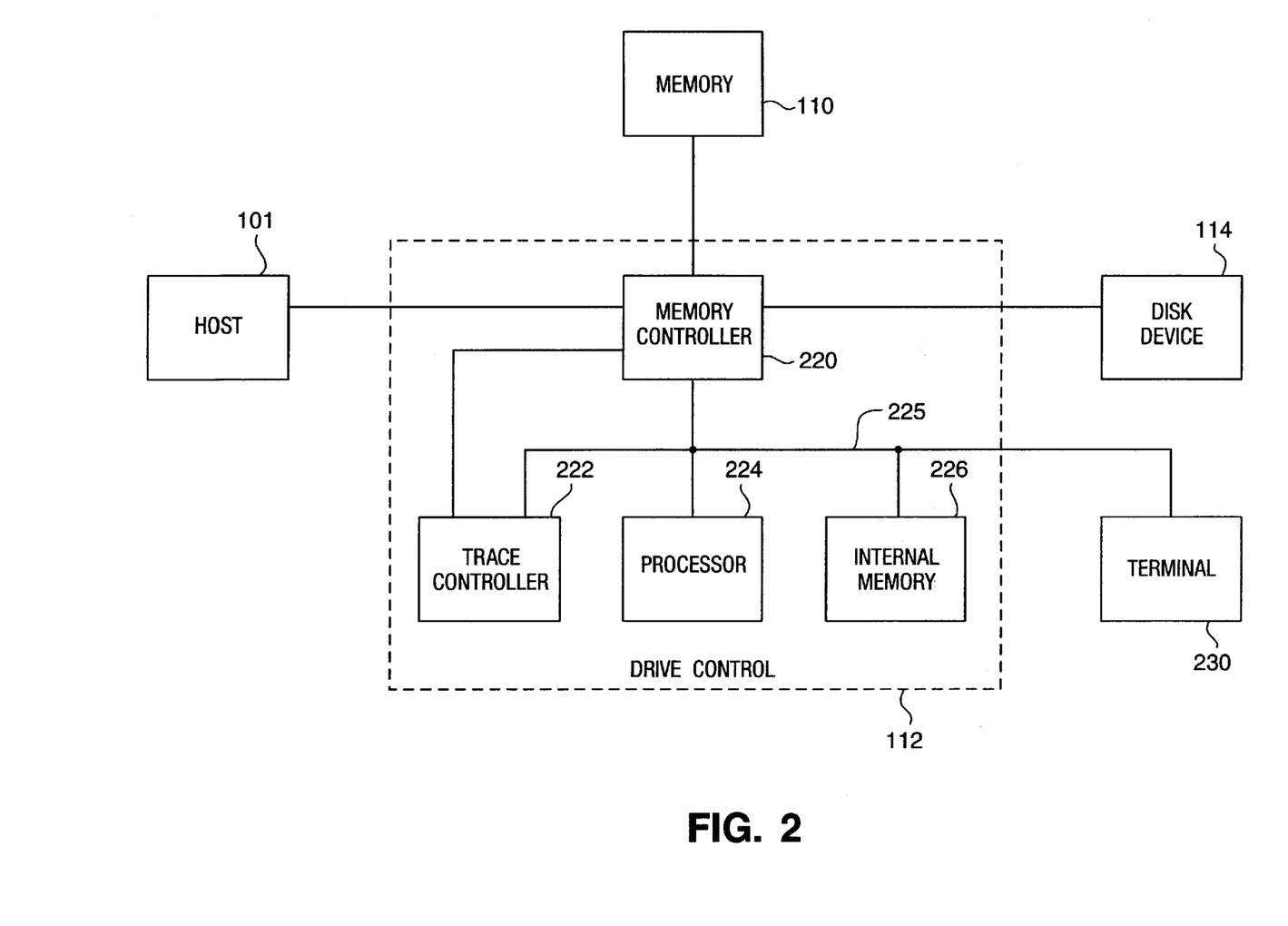
FIG. 2 is a block diagram of a drive control integrated circuit in an embodiment of the invention.
Figure 3:
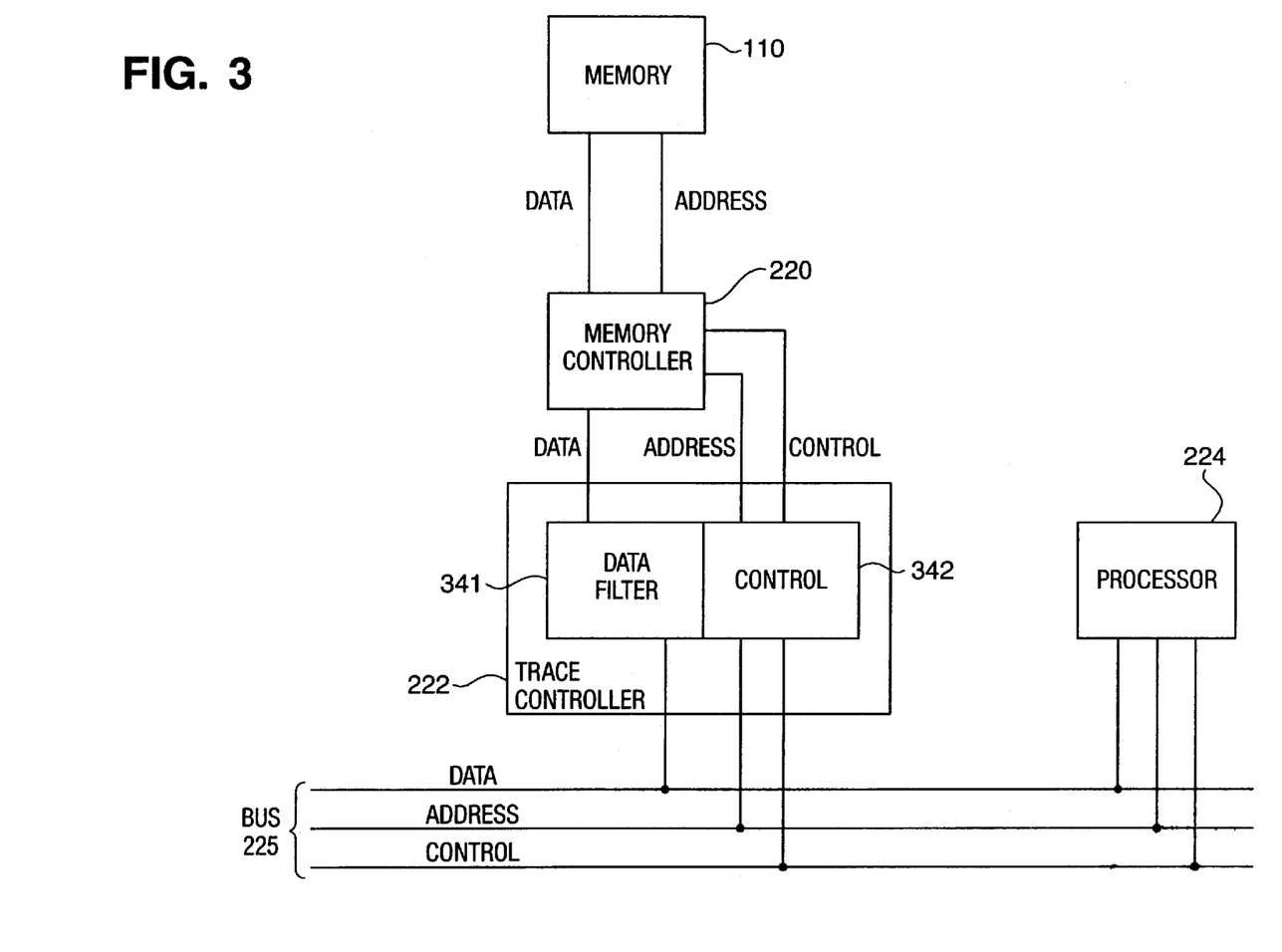
FIG. 3 is a block diagram of the internal bus, tracing logic, and memory controller within the drive control integrated circuit in an embodiment of the invention.

Drive Control Integrated Circuit Configuration—FIGS. 2–3

FIG. 2 also depicts the host 101, the memory 110, the drive control integrated circuit 112, and the disk device 114. The drive control integrated circuit 112 is comprised of memory controller 220, trace controller 222, processor 224, and internal memory 226 that are each connected to a bus 225. The processor 224 is also connected to a terminal 230 by an interface (not shown). Those skilled in the art appreciate that some conventional elements of the drive control integrated circuit 112 have been omitted for reasons of clarity. For example, a drive control integrated circuit typically includes a host interface, memory interface, disk interface, error check, and servo control.

The memory 110 and the internal memory 226 store operating instructions for the processor 224. The instructions are organized into program modules. The processor 224 retrieves the instruction from the memory 110 using the memory controller 220 and the bus 225. The processor 224 retrieves the instructions from the internal memory 226 using the bus 225. The processor 224 executes the instructions to position the disk device 114 and to transfer data for the host 101.

The memory controller 220 controls access to the memory 110. Each element provided with access to the memory 110 has a gate in the memory controller 220 that must be enabled to provide access to the memory 110. The memory controller 220 uses an arbitration procedure where only one gate is enabled at a time. The disk device 114 and the host 101 get priority access. The memory controller 220 allows the trace logic 222 and the processor 224 with memory access when the host 101 and the disk device 114 are idle. Typically, the trace logic 222 is given priority over the processor 224. In this way, the trace logic 222 uses the memory 110 in a transparent fashion that does not influence the performance of the drive control integrated circuit 112.

The trace controller 222 monitors the bus 225 and associated storage locations to select module numbers and operating parameters. The trace controller 222 forwards the selected module numbers and operating parameters to the memory controller 220 for storage in the memory 110. Note the distinction between the storage locations and the memory 110 in that the trace controller 222 obtains module numbers and operating parameters from the storage locations and selectively stores them in the memory 110.

The terminal 230 is connected to the processor 224 through an interface. The interface could be a conventional serial port and connection. System designers use the terminal 230 to direct the processor 224 to load trace qualifiers into the trace controller 222. System designers also use the terminal 230 to direct the processor 224 to retrieve the trace information from the memory 110 and provide it over the interface. The interface could include a modem at each end to allow system designers to operate the terminal 230 at a remote location from the disk drive system 100. In the alternative, the host 101 could be used to perform the functions of the terminal 230.

FIG. 3 depicts the components of the drive control integrated circuit 112 involved in trace operations. The processor 224 is connected to the data, address, and control lines of the bus 225. The trace controller 222 is comprised of a data filter 341 and control 342. The data filter 341 is connected to the data line of the bus 225. The control 342 is connected to the address and control lines of the bus 225. The memory controller 220 is connected to data filter 341 by a data line and to the control 342 by address and control lines. The memory controller 220 is connected to the memory 110 by data and address lines.

In operation, the processor 224 retrieves and executes instructions. The instructions are organized into modules and each module includes a trace macro. The trace macro causes the processor 224 to load the module number and selected operating parameters into storage locations available to the trace controller 222. The address of each instruction retrieved by the processor 224 is present on the address line of the bus 225. To start the trace, the control 342 monitors either the address line of the bus 225 or the storage locations to detect a selected address or module number. The control 342 then sends a signal over the control line to the memory controller 220 to begin storing data on the data line from the data filter 341. The control 342 also sends associated storage addresses to the memory controller 220 over the address line. The control 342 initializes the data filter 341 to begin filtering the module numbers provided to the storage locations by the processor 224. If the module number passes the filter, then the module number and the associated operating parameters are provided by the data filter 341 to the memory controller 220 over the data line. The memory controller 220 transfers the module numbers and operating parameters to the memory 110 over the data line and transfers the associated storage addresses to the memory 110 over the address line. The memory controller 220 performs an arbitration so the storage of trace information in the memory 110 does not affect the other operations of the drive control integrated circuit.

The control 342 continues to monitor the address and control lines of the bus 225, and the data filter continues to pass selected trace information to the memory controller 220. The control 342 stops the trace when a particular address or module is detected. The control 342 sends a signal over the control line to the memory controller 220 to stop storing data on the data line from the data filter 341. The control 342 stops sending storage addresses to the memory controller 220. The control 342 also causes the data filter 341 to stop passing the module numbers and operating parameters to the memory controller 220.

Figure 4:
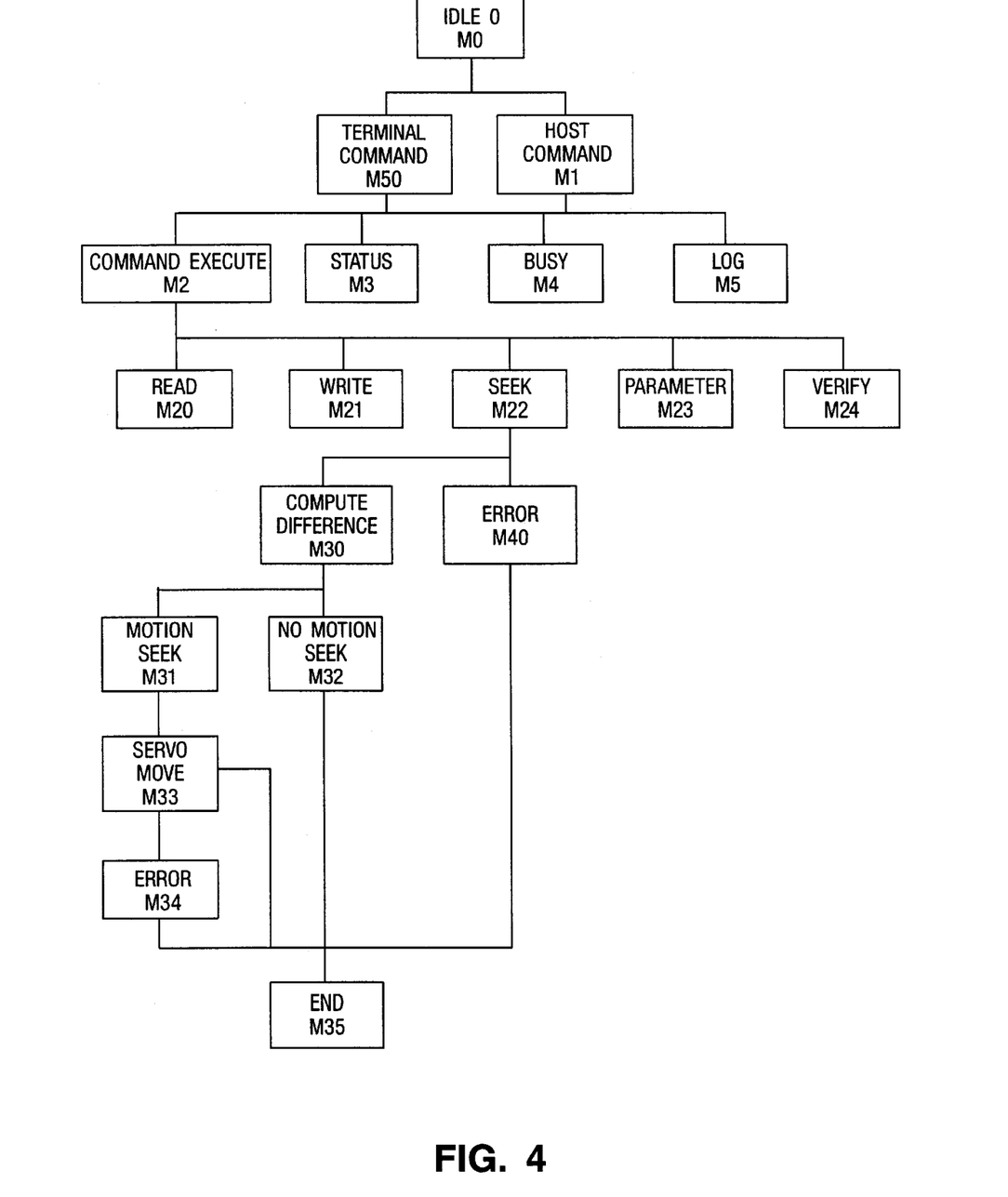
FIG. 4 is a logic diagram of program modules that are executed by the drive control integrated circuit in an embodiment of the invention.
Figure 5:
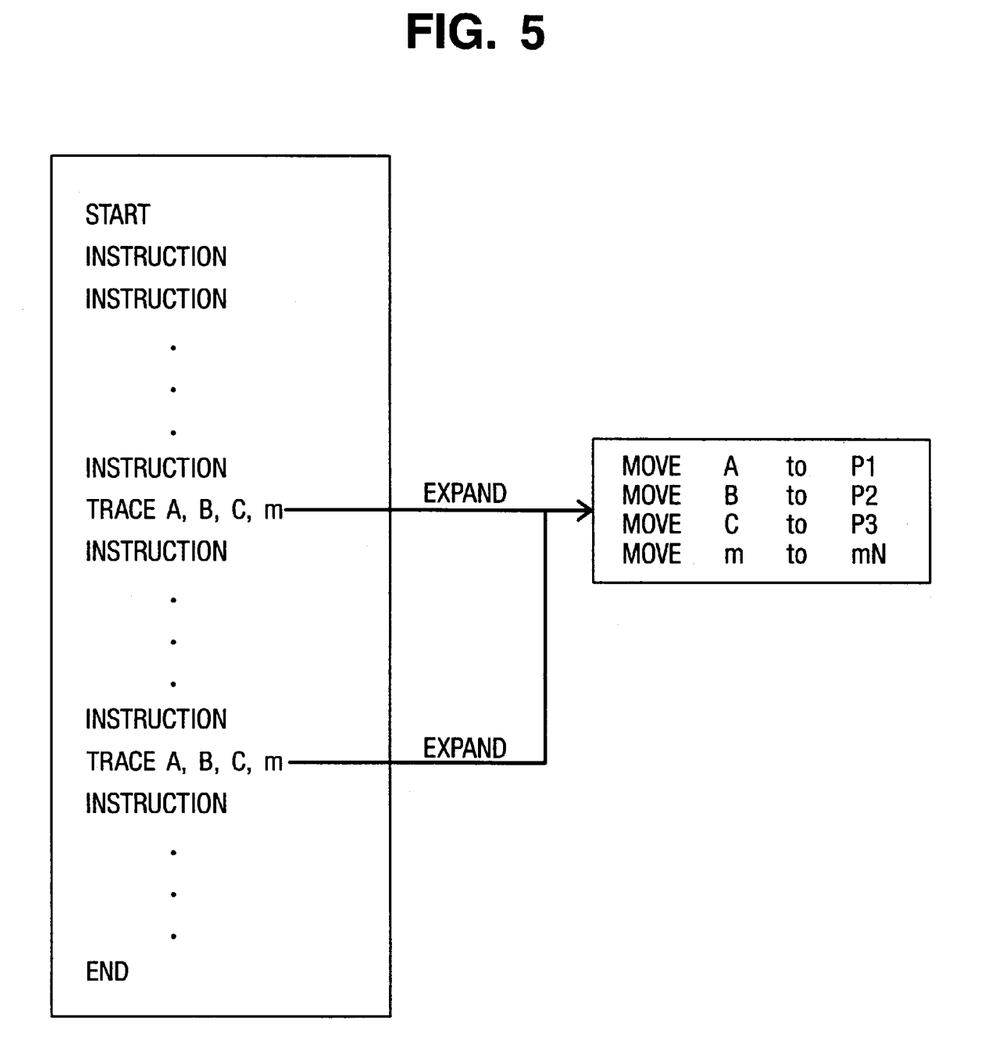
FIG. 5 lists tracing instructions that are executed by the drive control integrated circuit in an embodiment of the invention.

Modules and Instructions—FIGS. 4–5

FIG. 4 depicts some typical modules executed by the processor 224 in the drive control integrated circuit 112. A module is a set of instructions that is sometimes referred to as an object, function, macro, program, program segment, code structure, or other term. A module typically points to other modules based on module execution. Those skilled in the art will appreciate that there are typically numerous other modules and module configurations, and that the configuration of FIG. 4 is exemplary. The invention is not restricted to the modules and configuration of FIG. 4.

The initial module is the IDLE module with a module number of 0 (M0). If a host instruction is received, the IDLE M0 directs the processor to execute HOST INSTRUCTION M1. Depending on the instruction, M1 directs the processor to execute one of the modules M2–M5. The INSTRUCTION EXECUTE M2 directs processing to one of the modules M20–M24 based on the type of instruction. The READ M20, WRITE M21, and SEEK M22 are commonly executed to facilitate operation of the disk drive. The SEEK M22 provides positioning control for the disk device. If the SEEK M22 detects a parameter error, then processing is directed to PARAMETER ERROR M40, but processing typically proceeds to COMPUTE DIFFERENCE M30. COMPUTE DIFFERENCE M30 calculates the difference between the current head position and the desired head position. If the difference is zero, then the processing is directed to NO MOTION SEEK M32. If the difference is not zero, then the processing is directed to MOTION SEEK M31. MOTION SEEK M31 directs processing to SERVO MOVE M33 to provide control for the positioning of the head relative to the disk. SERVO MOVE M33 directs processing to SERVO ERROR M34 or to END M35. NO MOTION SEEK M32 and PARAMETER ERROR M40 also direct processing to END M35. END M45 typically loops back to IDLE M0.

System designers analyze the operation of the drive control integrated circuit by obtaining a list of the executed modules from the memory. For example, the sequence M0, M1, M2, M22, M40, M35 indicates a parameter error during a seek operation. The sequence M0, M1, M2, M22, M30, M32, M45 indicates a no motion seek. The sequence M0, M1, M2, M22, M30, M31, M33, M35 indicates a motion seek. The sequence M0, M1, M2, M22, M30, M31, M33, M34, M35 indicates a servo error during a motion seek operation.

Each module typically has important operating parameters. For example, the SEEK M22 may have operating parameters that indicate the desired position of the head relative to the disk. If PARAMETER ERROR M40 is encountered, these operating parameters may reveal that the host provided a faulty seek position that is not on the disk. The SERVO MOVE M33 may include an operating parameter that indicates the amount of servo correction required after the move. Those skilled in the art will appreciate numerous operating parameters of interest for a disk drive. It should be appreciated that the combination of module numbers and operating parameters provides system designers with a powerful view of system operation.

The module numbers can be assigned to assist in the trace operation. On FIG. 4, the host instruction modules are numbered in the twenties, the servo modules are numbered in the thirties, and the status modules are numbered in the forties. The numbering scheme allows the trace operation to focus on a specific group of modules by selecting all module numbers in a range. For example, a trace on servo operation would focus on module numbers in the thirties.

FIG. 5 depicts a sequence of instructions within one of the modules. The processor executes the instructions from the top down until the trace macro is encountered. The trace macro includes four values—A, B, and C that represent operating parameters and M that represents the module number. For example, A may represent the desired head location in the SEEK module. The trace macro is expanded to an exemplary instruction that contains four move instructions. The move instructions direct the processor to move the operating parameters and module number to P1, P2, P3, and MN respectively. P1, P2, P3, and MN represent storage locations, such as registers, that are available to the trace controller or integrated within the trace controller.

After the trace macro is executed, additional instructions are processed until another trace macro is encountered. A module does not require the second trace macro, but multiple trace macros can be included in a module. The second trace macro includes the same module number M and additional operating parameters for A, B, and C. The trace macro is expanded to the same instructions that direct the processor to move the operating parameters and module number to P1, P2, P3, and MN respectively.

Figure 6:
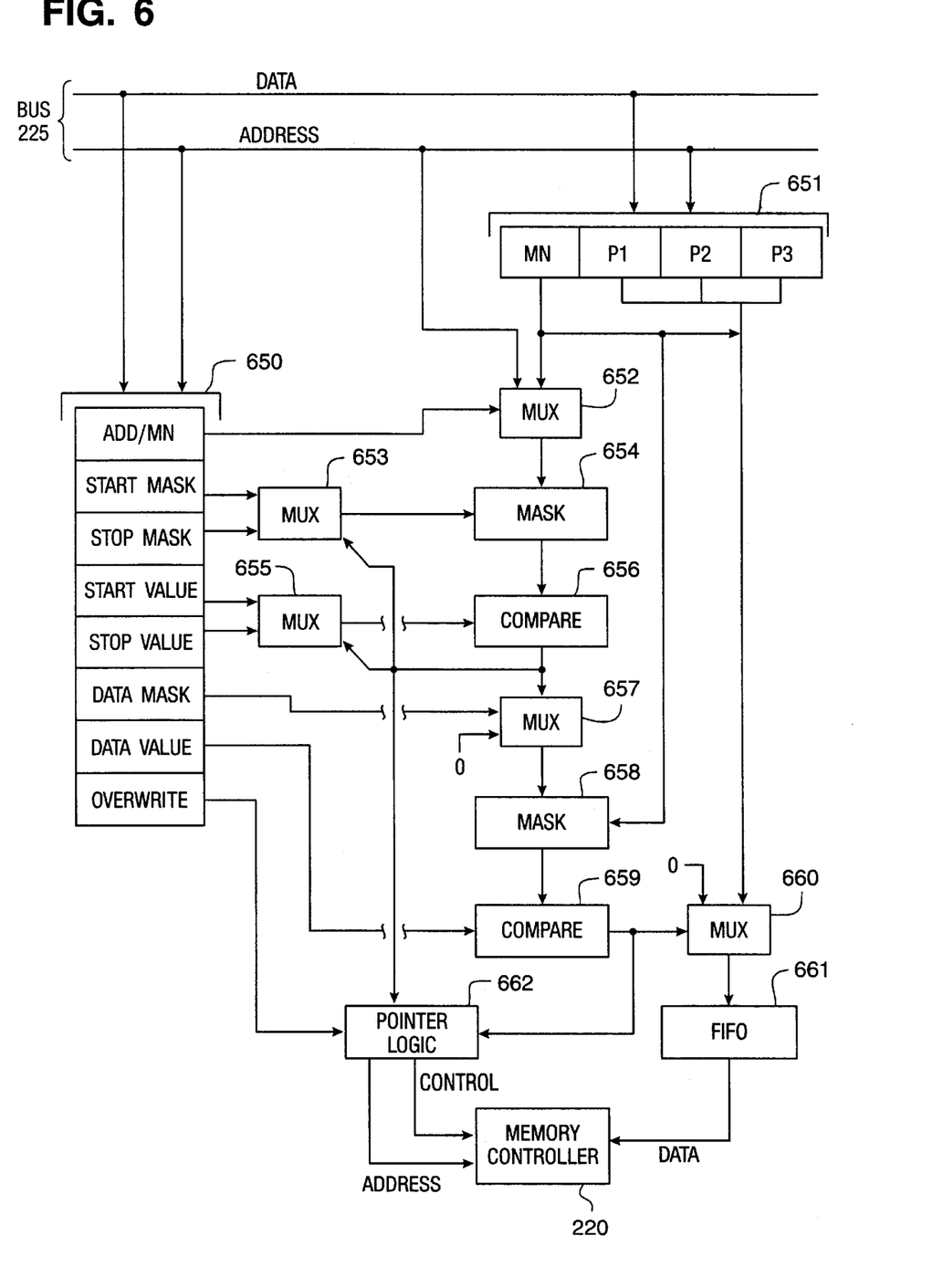
FIG. 6 is a block diagram of the tracing logic within the drive control integrated circuit in an embodiment of the invention.

Trace Controller Logic—FIG. 6

FIG. 6 depicts the logic of trace controller 222 of FIG. 2. The configuration of the logic depicted on FIG. 6 is exemplary, and the invention is not restricted to this particular configuration. The data and address lines of bus 225 are used to load the trace qualifiers from the system designers into registers 650. The trace qualifiers include an address/module selection, start mask, stop mask, start value, stop value, data mask, data value, and overwrite selection. The data and address lines of bus 225 are used to load the module numbers and the operating parameters from the processor 224 into registers 651. The registers 651 contain the MN, P1, P2, and P3 storage locations identified in the macro instructions.

The mux 653 is initially set to load the start mask into mask 654. The mux 655 is initially set to load the start value into compare 656. The address/module selection in the registers 650 controls the mux 652 to pass either the address from the bus 225 or the module number from the registers 651 to the mask 654. This allows the system designer to start and stop trace operations based on either address or module number.

The mask 654 processes the address or module number bit by bit and passes the bit if a one bit is present in the corresponding bit location in the mask. For example, if the mask is 11100000, then the first three bits of the module number are passed and the last five bits are not. If the module number is 101000111, then the mask passes 101 to compare 656. If the mask is all ones, then the entire module number is passed, and if the mask is all zeros, then nothing is passed. The mask allows a comparison to only portions of a module number or address so that groups of modules or addresses that share a common numbering scheme, such as servo modules, can be traced.

The compare 656 compares the value from the mask 654 with the start value from the registers 650. The compare 656 or 659 can find a match based on a specific value or can find a match if any bit is passed from the mask. If a match is found in the compare 656, then the compare 656 signals to the pointer logic 662 that a trace has started. The compare 656 also controls the muxes 653 and 655 to load the stop mask and the stop value into the mask 654 and the compare 656 respectively.

The data mask from the registers 650 and the module number from the registers 651 are transferred to the mask 658. The data value from the registers is transferred to compare 659. The mask 658 passes values to the compare 659. If the compare 659 finds a match between the data value from the registers 650 and the value from the mask 658, then compare 659 signals the pointer logic 662 that trace data has been selected for transfer to the memory 110.

The pointer logic 662 needs signals from both the compare 656 and the compare 659 to begin the transfer of trace data to the memory 110. The compare 656 signals the start of the trace, and the compare 659 signals that trace data has been selected. When the trace has started and trace data has been selected, then the pointer logic 662 controls write 660 to transfer the selected trace data from the registers 651 to the FIFO 661. The pointer logic 662 also sends control and address information to the memory controller 220 to cause the memory controller 220 transfer the selected trace data from the FIFO 661 to the memory 110.

The mask 658 continues to receive module numbers and pass values to the compare 659. The compare 659 continues to identify matches and signal the pointer logic 662 that trace data has been selected. The pointer logic 662 controls the write 660 to transfer selected trace data from the registers 651 to the FIFO 661. The pointer logic 662 also provides the memory controller 220 with control signals and new pointer addresses to transfer the selected trace data from the FIFO 661 to the memory 110. As a result, trace data from the registers 651 is continually processed and selectively stored in the memory 110 after the trace is started.

The mask 654 continues to receive addresses or module numbers and pass values to the compare 656 based on the stop mask. If the compare 656 finds a match with the stop value, then the compare 656 signals the pointer logic 662 to stop the trace. The pointer logic 662 signals the memory controller 220 that the data transfer has stopped. The compare 656 may control the muxes 653 and 655 to load the start mask and the start value into the mask 654 and the compare 656 respectively.

It should be appreciated that the logic of FIG. 6 allows system designers to specify the start and stop of the trace based on either addresses or module numbers. The system designers also specify the module numbers that are selectively stored in the memory along with their associated operational parameters.

Figure 7:
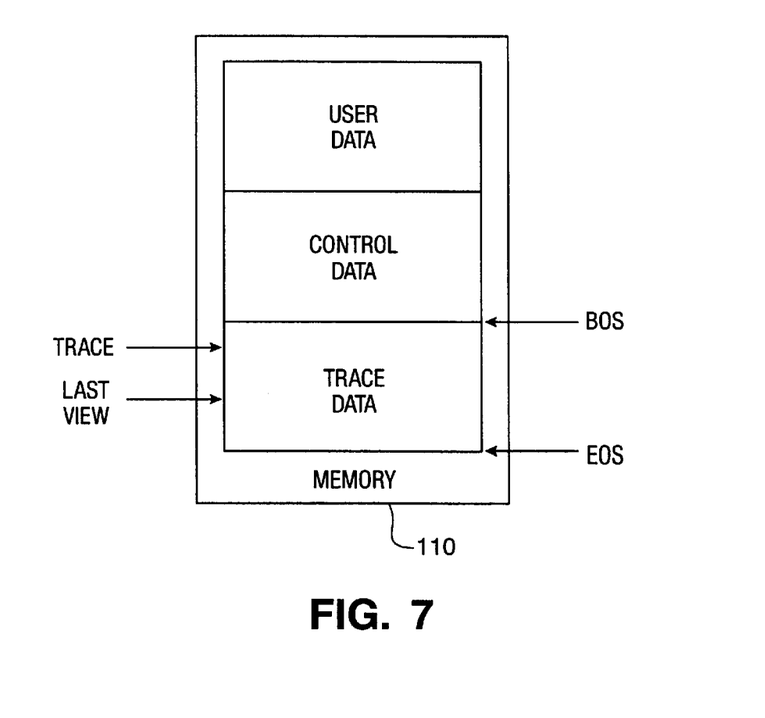
FIG. 7 is a block diagram of the memory in an embodiment of the invention.
Figure 8:
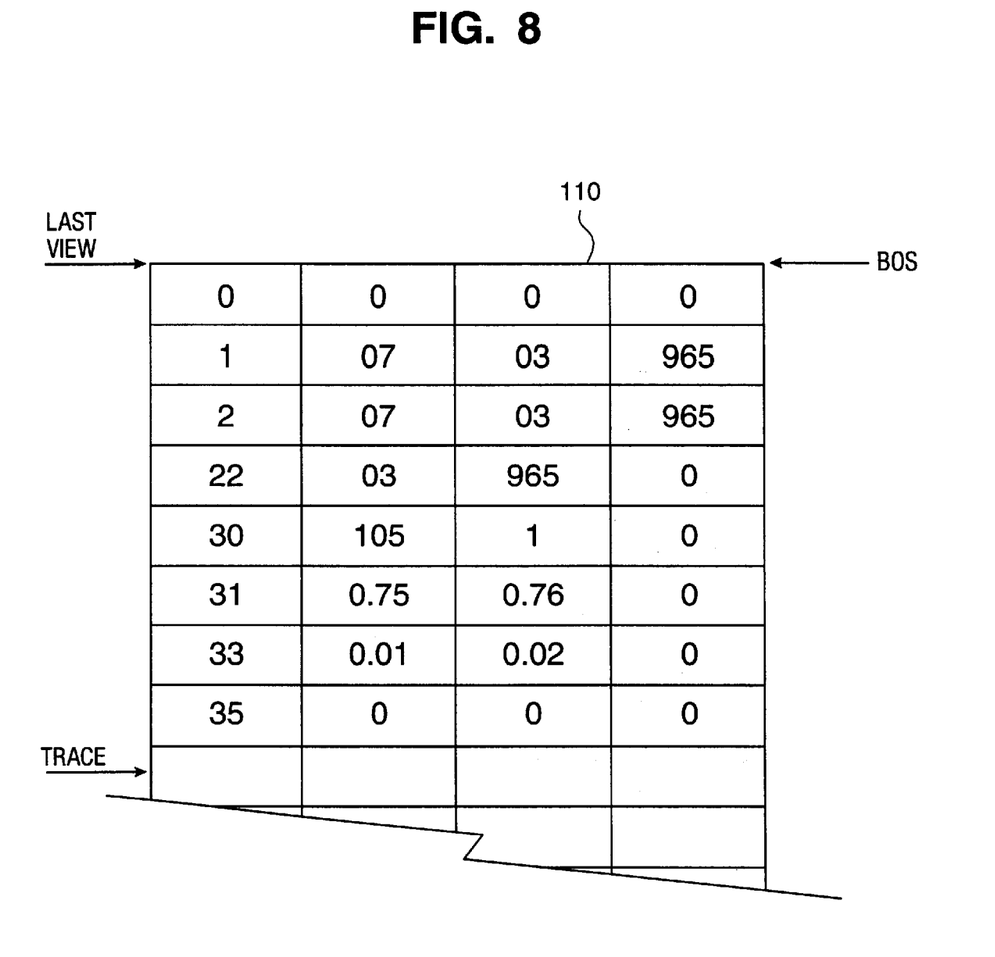
FIG. 8 depicts the tracing information stored in the memory in an embodiment of the invention.

Memory—FIGS. 7–8

FIG. 7 depicts the memory 110 of FIG. 1. The memory is allocated into three segments. The first segment is for user data, the second segment is for control data, and the third segment is for trace data. The trace data segment is bounded by a Beginning of Segment (BOS) and an End of Segment (EOS). The configuration of the memory 110 depicted on FIG. 7 is exemplary, and the invention is not restricted to this particular configuration.

A trace pointer and a last view pointer are used to track the trace data. The trace pointer identifies the current write address for the trace data. The trace pointer is the address provided by the pointer logic 662 to the memory controller 220 over the address line. During a trace, the pointer is typically incremented to successive addresses until EOS is encountered, and then the addressing wraps around to the BOS to form a circular trace buffer. The last view pointer indicates the last address read by the system designers, typically using the terminal 230 the host 101. The trace pointer and the last view pointer are initially set to the BOS.

If the trace pointer reaches the last view pointer, then the trace must be stopped or unread trace data will be overwritten. The system designers specify how to handle this condition with the over-write selection in the registers 650. If the over-write selection is negative, then the pointer logic 662 signals the memory controller 220 to stop transferring data to the memory 110 when the trace pointer reaches the last view pointer. If the over-write selection is positive, then the pointer logic 662 allows the memory controller 220 to over-write data in the memory 110 when the trace pointer reaches the last view pointer.

In the alternative, the last view pointer could be eliminated. When the system designer retrieves the trace data, the entire trace data segment is retrieved. The trace pointer is used to determine the end of the trace data within the segment, and the trace pointer is reset to BOS. When the next trace is performed, an overwrite will occur if the trace pointer is allowed to wrap back to BOS and continue the trace.

FIG. 8 depicts some sample trace data loaded into the memory 110 by the drive control integrated circuit 112. The trace data includes the module number and associated operating parameters from left to right respectively. The first column indicates that modules 0, 1, 2, 22, 30, 31, 33, and 35 were sequentially executed to perform a motion seek. The parameters for HOST INSTRUCTION M1 indicate that the instruction code in the host instruction was a seek (07) to head number 03 and cylinder number 965. The cylinder number identifies a particular location common to all of the disks, and the head number identifies a particular side of a particular disk. Together head number and cylinder number identify a particular circular track on a particular side of a disk. The INSTRUCTION EXECUTE M2 has the same parameters. The parameters for SEEK M22 indicate that head 03 moved to cylinder 965 with an error code (0) that indicates no error was detected. The parameters for COMPUTE DIFFERENCE M30 indicate that head moved 105 cylinders in the forward direction (1) and that no error was detected (0). The parameters for SERVO MOVE M33 indicate that the off-track tolerance of 0.01 and the run-out tolerance of 0.02 were achieved without error (0). The trace pointer is set to the next address and the last view pointer indicates that no trace data has been retrieved.

Conclusion

The invention provides a drive control integrated circuit with an intelligent and efficient tracing capability. The drive control integrated circuit executes operating instructions grouped into modules and stores the module numbers for executed modules in a memory. System designers can then retrieve the module numbers from the memory to assess the operation of the drive control integrated circuit. The drive control integrated circuit also stores operating parameters in the memory that are associated with the executed modules.

Advantageously, the invention allows system designers to specify a particular trace operation and wait for the drive control integrated circuit to load the module numbers and operational parameters of interest into the memory. The use of selected module numbers and operating parameters reduces the amount of data typically stored in conventional trace operation. The reduction in data increases the available bandwidth to the memory and allows a detailed trace without filling up the memory allocated for the trace.

Since arbitration is used to allow the trace controller to access the memory, the system is not affected by the trace operation. In addition, the processor only executes an additional macro in each module to support the trace. The effect of the trace operation on the processor is negligible. Therefore, the invention provides programmable and efficient tracing without influencing real-time system performance. This lack of impact allows for accurate system evaluation under realistic operating conditions.

Those skilled in the art can appreciate variations of the above-described embodiments that fall within the scope of the invention. Therefore, the invention is not limited to the specific embodiments discussed above, but only by the following claims and their equivalents.

What is claimed is:

1. A drive control integrated circuit for monitoring operation of a disk drive, comprising:
a processor operational to execute modules comprised of instructions, wherein each module includes a trace macro configured to direct the processor to move a module number and operating parameters corresponding to each of the executed modules to a storage location; and
a trace controller operationally coupled to the processor and operational to transfer from the storage location trace information for storage in a memory, wherein the trace information identifies at least some of the executed modules and wherein the trace information includes the operating parameters associated with the at least some of the executed modules.

2. The drive control integrated circuit of claim 1 further comprising a memory controller operationally coupled to the trace controller and operational to transfer the trace information from the trace controller to the memory.

3. The drive control integrated circuit of claim 1 wherein one of the operating parameters is an instruction code.

4. The drive control integrated circuit of claim 1 wherein one of the operating parameters is a head number.

5. The drive control integrated circuit of claim 1 wherein one of the operating parameters is a cylinder number.

6. The drive control integrated circuit of claim 1 wherein one of the operating parameters is an error code.

7. The drive control integrated circuit of claim 1 wherein one of the executed modules is a seek module.

8. The drive control integrated circuit of claim 1 wherein one of the executed modules is a read module.

9. The drive control integrated circuit of claim 1 wherein one of the executed modules is a write module.

10. The drive control integrated circuit of claim 1 wherein one of the executed modules is an error module.

11. The drive control integrated circuit of claim 1 wherein one of the executed modules is a servo module.

12. The drive control integrated circuit of claim 1 wherein the trace controller is operational to start and stop transfer of the trace information based on the module numbers in the storage location.

13. The drive control integrated circuit of claim 12 wherein the trace controller is operational to use a mask to compare the module numbers to a value.

14. The drive control integrated circuit of claim 1 wherein the trace controller is coupled to the processor by an internal bus.

15. The drive control integrated circuit of claim 14 wherein the trace controller is operational to start and stop the transfer of the trace information based on addresses from the internal bus.

16. The drive control integrated circuit of claim 15 wherein the trace controller is operational to use a mask to compare the addresses to a value.

17. The drive control integrated circuit of claim 1 wherein the trace controller comprises a data filter that is operational to select particular executed modules for storage in the memory.

18. A method for operating a drive control integrated circuit portion of a disk drive that comprises a processor and a trace controller, the method comprising:
executing modules in the processor wherein the modules are comprised of instructions, wherein the executing includes executing a trace macro in each of the modules that causes the processor to load a module number and operating parameters for each of the executed modules into data storage;
selecting at least a portion of the executed modules with the trace controller; and
transferring with the trace controller trace information from the data storage for storage in a memory, wherein the trace information identifies the selected modules and the trace information includes the module number and the operating parameters associated with the selected modules.

19. The method of claim 18 further comprising transferring the trace information from the trace controller to the memory.

20. The method of claim 18 wherein one of the operating parameters is an instruction code.

21. The method of claim 18 wherein one of the operating parameters is a head number.

22. The method of claim 18 wherein one of the operating parameters is a cylinder number.

23. The method of claim 18 wherein one of the operating parameters is an error code.

24. The method of claim 18 wherein one of the selected modules is a seek module.

25. The method of claim 18 wherein one of the selected modules is a read module.

26. The method of claim 18 wherein one of the selected modules is a write module.

27. The method of claim 18 one of the selected modules is an error module.

28. The method of claim 18 wherein one of the selected modules is a servo module.

29. The method of claim 18 further comprising starting and stopping the transfer of the trace information based on the module numbers in the data storage.

30. The method of claim 18 further comprising starting and stopping the transfer of the trace information based on addresses from an internal bus.

31. A drive control integrated circuit comprising:
a processor operational to execute modules comprised of instructions, wherein each module includes a trace macro configured to cause the processor to move a module number associated with each executed module to a storage location; and
a trace controller operationally coupled to the processor and operational to transfer from the storage location trace information for storage in a memory, wherein the trace information identifies at least some of the executed modules; p1 wherein the trace controller is operational to start and stop the transfer of the trace information based on the module numbers in the storage location.

32. The drive control integrated circuit of claim 31, further comprising a memory controller operationally coupled to the trace controller and operational to transfer the trace information from the trace controller to the memory.

33. The drive control integrated circuit of claim 31, wherein the trace information includes operating parameters associated with the executed modules, the operating parameters being selected from the group consisting of an instruction code, a head number, a cylinder number, and an error code.

34. The drive control integrated circuit of claim 31, wherein one of the executed modules is a seek module.

35. The drive control integrated circuit of claim 31, wherein one of the executed modules is a read module.

36. The drive control integrated circuit of claim 31, wherein one of the executed modules is a write module.

37. The drive control integrated circuit of claim 31, wherein one of the executed modules is an error module.

38. The drive control integrated circuit of claim 31, wherein one of the executed modules is a servo module.

39. The drive control integrated circuit of claim 31, wherein the trace macro directs the processor to move operating parameters to the storage location.

40. The drive control integrated circuit of claim 31, wherein the trace controller is operational to use a mask to compare the module numbers to a user-specified trace value.

41. The drive control integrated circuit of claim 31, wherein the trace controller is coupled to the processor by an internal bus.

42. The drive control integrated circuit of claim 41, wherein the trace controller is operational to start and stop the transfer of the trace information based on addresses from the internal bus.

43. The drive control integrated circuit of claim 42, wherein the trace controller is operational to use a mask to compare the addresses to a value.

44. The drive control integrated circuit of claim 31, wherein the trace controller comprises a data filter that is operational to select particular executed modules for storage in the memory.

45. A drive control integrated circuit comprising:
a processor operational to execute modules comprised of instructions and trace macros, wherein one of the executed modules is a read module; and
a trace controller operationally coupled to the processor and operational to transfer trace information for storage in a memory, wherein the trace information identifies at least some of the executed modules by module number.

46. A drive control integrated circuit comprising:
a processor operational to execute modules comprised of instructions and trace macros, wherein one of the executed modules is a write module; and
a trace controller operationally coupled to the processor and operational to transfer trace information for storage in a memory, wherein the trace information identifies at least some of the executed modules by module number.

47. A drive control integrated circuit comprising:
a processor operational to execute modules comprised of instructions; and
a trace controller operationally coupled to the processor and operational to transfer trace information for storage in a memory, wherein the trace information identifies at least some of the executed modules by a module number and wherein the trace controller comprises a data filter that is operational to select particular executed modules based on the module numbers for storage in the memory.

48. A method for operating a drive control integrated circuit that comprises a processor and a trace controller, the method comprising:
executing modules in the processor wherein the modules are comprised of instructions;
executing a trace macro in the processor causing the processor to load a module number for each executed module into data storage;
selecting at least a portion of the executed modules in the trace controller; and
transferring trace information from the trace controller for storage in a memory, wherein the trace information identifies the selected modules by module number.

49. The method of claim 48, further comprising transferring the trace information from the trace controller to the memory.

50. The method of claim 48, wherein the trace information includes operating parameters associated with the selected modules, the operating parameters being selected from the group consisting of an instruction code, a head number, a cylinder number, and an error code.

51. The method of claim 48, wherein one of the selected modules is a seek module.

52. The method of claim 48, wherein one of the selected modules is a read module.

53. The method of claim 48, wherein one of the selected modules is a write module.

54. The method of claim 48, wherein one of the selected modules is an error module.

55. The method of claim 48, wherein one of the selected modules is a servo module.

56. The method of claim 48, further comprising moving a module number from the processor to a storage location.

57. The method of claim 56, further comprising moving operating parameters from the processor to a storage location.

58. The method of claim 56, further comprising starting and stopping the transfer of the trace information based on the module numbers in the storage location.

59. The method of claim 48, further comprising starting and stopping the transfer of the trace information based on addresses from an internal bus.

60. A method for operating a drive control integrated circuit that comprises a processor and a trace controller, the method comprising:

in the processor, executing modules having a trace macro wherein the modules are comprised of instructions;

selecting at least a portion of the executed modules in the trace controller, wherein one of the selected modules is a read module; and     transferring trace information from the trace controller for storage in a memory, wherein the trace information identifies the selected modules by module number.

61. A method for operating a drive control integrated circuit that comprises a processor and a trace controller, the method comprising:

in the processor, executing modules having a trace macro wherein the modules are comprised of instructions;

selecting at least a portion of the executed modules in the trace controller, wherein one of the selected modules is a write module; and     transferring trace information from the trace controller for storage in a memory, wherein the trace information identifies the selected modules by a module number.

* * * * *